United States Patent Office 2,957,026
Patented Oct. 18, 1960

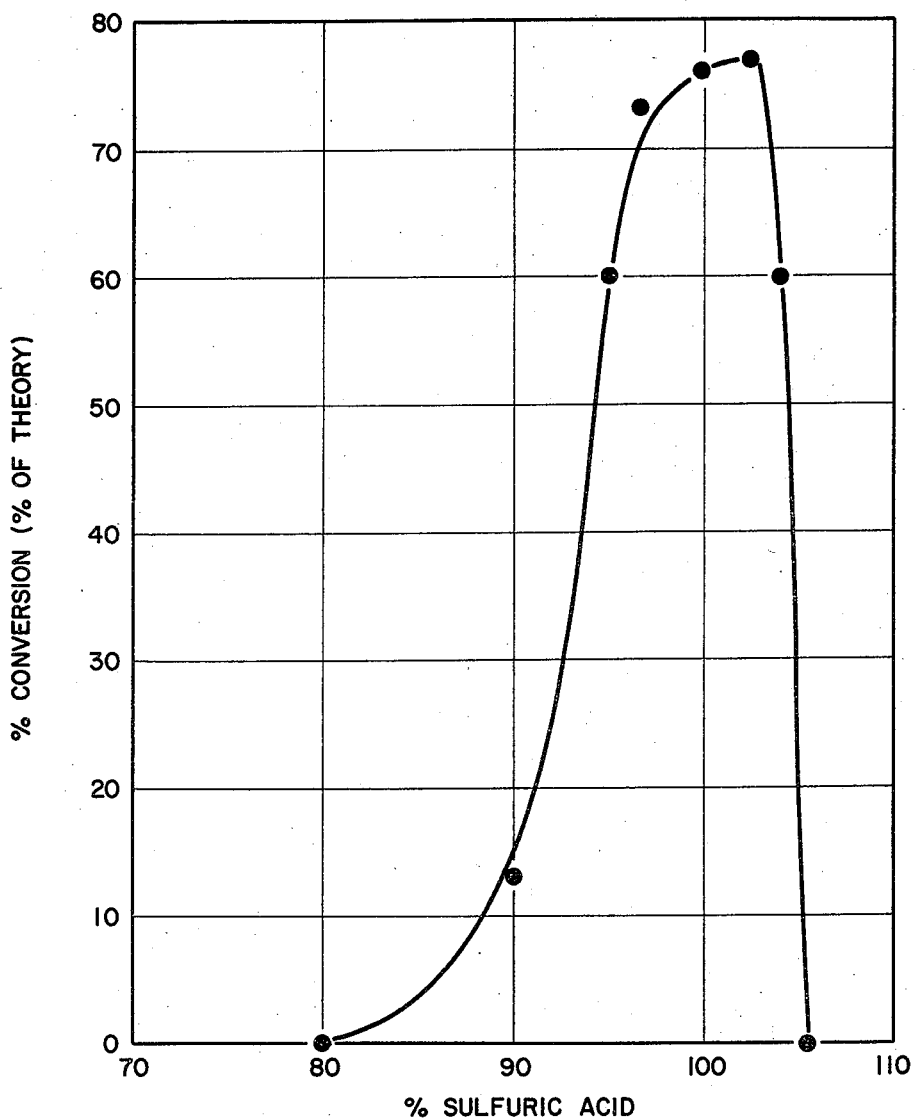

2,957,026

PREPARATION OF MUCOCHLORIC ANHYDRIDE

Joseph Halpern, New Providence, N.J., assignor to Berkeley Chemical Corporation, Berkeley Heights, N.J., a corporation of New Jersey Filed Jan. 13, 1959, Ser. No. 786,542

4 Claims. (Cl. 260—546)

This invention relates to an improved method of preparing mucochloric anhydride from mucochloric acid. More particularly it relates to a process of this nature in which the preparation is carried out in the presence of sulfuric acid of a carefully controlled concentration and in the absence of a diluent.

Mucochloric acid is a known chemical, e.g. see Heilbron "Dictionary of Organic Compounds," volume 3, page 539. The anhydride has found utility as a pharmaceutical and as a parasiticide.

Mucochloric anhydride has been prepared from mucochloric acid in several ways. One method involves refluxing mucochloric acid in a benzene and dioxane mixture, using benzene sulfonic acid as a catalyst, until the theoretical amount of water is collected. The aromatic sulfonic acid catalyst has been prepared in situ in a similar manner such as by the action of oleum on a monochlorobenzene at a temperature of 0–20° C. (J.A.C.S. 72:2437 (1950)).

These methods entail several disadvantages. These are: loss of solvent, a discolored product and difficulty of separation.

It has now surprisingly been found that mucochloric anhydride can be prepared from mucochloric acid by treating the latter with carefully controlled concentrated sulfuric acid in the absence of solvent or sulfonic acid catalyst. The term diluent covers both or either of these materials. Data demonstrate that sulfuric acid concentrations outside of this controlled range result in sharply diminished yields.

The concentration of the sulfuric acid as stated is extremely critical for the operation of this process. Thus ranges of 80–105.5 wt. percent preferably 95–103 wt. percent have been found to give the best results. The graph shown in the drawing demonstrates how the yields drop dramatically at figures outside these ranges. It is especially surprising that these yields diminish at the high end as well as at the low end. At concentrations above the top end as well as below, the mucochloric acid can be removed largely unchanged and unreacted.

The sulfuric acid figures over 100% of course are based on the presence of $SO_3$ as is known in the art. The quantity of sulfuric acid employed is in the range of 1–10/1 parts by weight based on the mucochloric acid.

The temperature of the treatment is not critical and conveniently may be conducted at ordinary room temperature e.g. 20–30° C.

The mucochloric anhydride product is worked up by admixing e.g. pouring the sulfuric acid, light colored solution into cold water (maintained that way by ice or external cooling). The temperature is maintained conveniently below 50° C. The mucochloric anhydride and unreacted mucochloric acid crystallize out. These crystals are separated e.g. by filtration. The separated crystals are leached once with hot e.g. boiling water for a short time e.g. a maximum of about five minutes to prevent hydrolysis. The mucochloric acid dissolves in the hot water leaving the mucochloric anhydride crystals which can be separated by filtration. The unreacted mucochloric acid can also then be recovered by crystallization.

This invention will be better understood by reference to the following example.

Example 1

18.8 gms. of mucochloric acid was charged into 37.6 gms. of 102.5% sulfuric acid. The mixture was kept at 23–25° C. for 24 hours. The light amber solution was poured into crushed ice so that the highest temperature reached was 40° C. The solid was filtered and washed with cold water. The washed solid was treated with 40 ml. of boiling water for about one minute and was hot filtered. The mucochloric anhydride was dried at 80° C. The amount of mucochloric anhydride recovered was 13.7 gms. or a 77% yield. Taking into consideration the recovered mucochloric acid the yield of mucochloric anhydride was 96.2% of theory.

The mother liquor was cooled to 10° C. whereby 3.8 gms. (20%) of mucochloric acid was recovered.

In addition to the advantage of a high yield, a white product was immediately obtained.

Similar examples were run as in Example 1, varying the sulfuric acid concentration. The data points and results are shown in the graph in the drawing. These show dramatically the importance of the sulfuric acid concentration. The ordinate shows the conversion of mucochloric acid to mucochloric anhydride as percent of theory which is a vigorous test.

The mucochloric anhydride includes both the alpha and beta isomers since a mixture is obtained.

The process of this invention is also applicable to the other halogen derivatives, e.g. mucobromic, mucoiodic and mucofluoric acid. The advantages of this invention will be apparent to the skilled in the art. High yields of muchochloric anhydride are obtained in an efficient manner. Solvent recovery is eliminated and materials handling simplified. The unreacted acid as well as the product is recovered. The mucochloric anhydride is recovered as a pure white product without the necessity of any recrystallization.

It is to be understood that this invention is not limited to the specific examples which have been offered merely as illustrations and that modifications may be made without departing from the spirit of the invention.

What is claimed is:

1. A method of preparing mucochloric anhydride which consists of treating mucochloric acid with a sulfuric acid of a concentration in the range of 80 to 105.5 wt. percent, the sulfuric acid being utilized in an amount of 1–10/1 parts by weight based on the mucochloric acid in the absence of a diluent and recovering the anhydride.

2. The process of claim 1 in which the concentration is in the range of 95 to 103 wt. percent.

3. The process of claim 1 in which the temperature utilized is in the range of 20° to 30° C.

4. The process of claim 1 including the additional steps of admixing the resultant reaction mixture with water maintained at below 50° C. wherein mucochloric anhydride and mucochloric acid crystallize out; treating the crystals with hot water to dissolve the mucochloric acid without hydrolyzing the anhydride and separating the mucochloric anhydride product.

References Cited in the file of this patent

Bachman, J.A.C.S., vol. 72, pages 2535–37 (1950).